Jan. 1, 1924 1,479,436

E. PIQUEREZ

GREASE CUP FOR FLUID LUBRICANTS

Filed May 1, 1920

Inventor
E. Piquerez
By H. R. Kerslake
Attorney

Patented Jan. 1, 1924.

1,479,436

UNITED STATES PATENT OFFICE.

EMILE PIQUEREZ, OF ST. URSANNE, SWITZERLAND.

GREASE CUP FOR FLUID LUBRICANTS.

Application filed May 1, 1920. Serial No. 378,345.

*To all whom it may concern:*

Be it known that EMILE PIQUEREZ, a citizen of the Swiss Republic, residing at St. Ursanne, Switzerland, has invented certain new and useful Improvements in Grease Cups for Fluid Lubricants, of which the following is a specification.

My invention relates to a grease-cup for fluid lubricants in which the distribution of the lubricant may be very accurately regulated. In said grease-cup, the lubricant reaches the member to be lubricated through a distributing conduit into which the lubricant flows through a valve. The opening of the said valve may be very accurately regulated, and its position indicated by operating an indicating means located outside the grease-cup. The aforesaid valve is preferably positioned at the lowermost part of the apparatus so that full pressure from the liquid within the grease-cup may be exerted on the valve. Moreover, the body of said grease-cup is made of a material commercially known as "cervinite" which is a substance not unlike celluloid, being constituted of cellulose and acetone, and which is transparent, practically unbreakable and uninflammable. The result is that the grease-cup will stand shocks; will be of light weight, will have a pleasing appearance and will permit controlling at any moment of the quantity of grease fed therefrom. Besides, the quantity of lubricant actually reaching the member to be lubricated may be observed through the distributing conduit.

Figure 1:
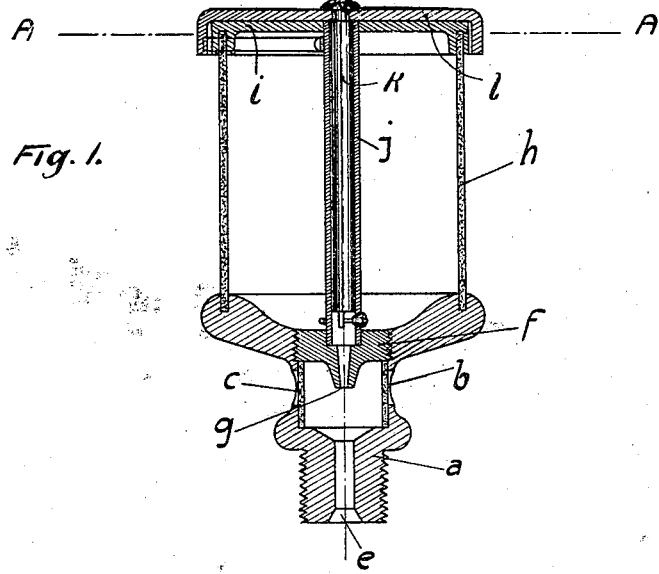
Figure 1 is an axial sectional view of the preferred embodiment of my invention.
Figure 2:
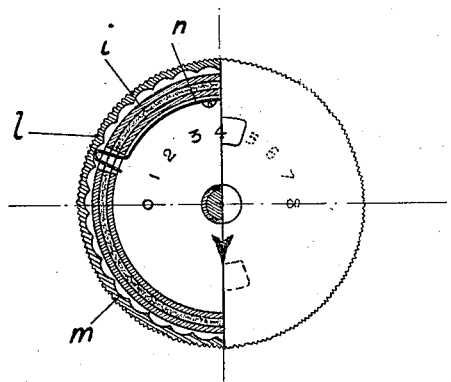
Fig. 2 is a top view partly in section, the section being taken on the line A—A of Fig. 1.
Figure 3:
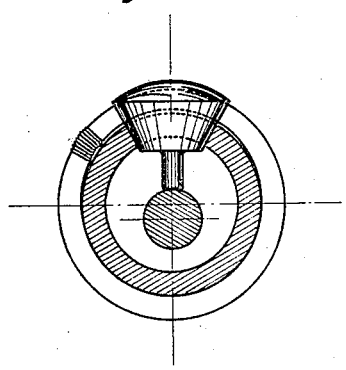
Figs. 3 and 4 are views of the valve used for regulating the grease-cup.
Figure 4:
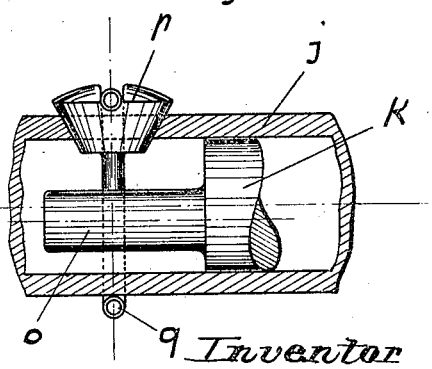

Referring to the aforesaid drawings, $a$ is the foot or stem of the grease cup. The foot is bored in the direction of its axis as shown at $b$ to provide a chamber to receive a tube $c$. The tube is formed of cervinite, a substance similar to celluloid, but practically unbreakable, uninflammable and transparent. Said tube may be seen through lateral apertures provided in the foot. A passage $e$ conveys the oil to the member to be lubricated. Tube $c$ is kept in its position by a threaded plug $f$ having a nozzle $g$ which extends into the tube $c$ and forms a dropping device for the lubricating mixture.

The upper portion of the foot is provided with an annular groove in which is seated the lower end of a tube $h$ of large diameter. This tube is also made of cervinite, and it constitutes the body of the grease-cup and forms a reservoir for the oil. A lid $i$ is secured to the upper end of said tube $h$ and is connected with a tube $j$ which extends downwardly through the whole grease-cup body and has its lower end seated in the plug $f$. Within said tube $j$ is a stem $k$ riveted to a cirular cover $l$ the outer periphery of which is knurled to provide a hand engaging surface and the inner periphery $m$ of which is corrugated so as to form key-grooves within which operates a spring $n$ fixed to the lid $i$. Said grooves and spring will allow of stopping the cover $l$, and the stem $k$ when in a certain position relatively to the grease-cup itself. The lower end of stem $k$ is provided with a finger $o$ eccentrically disposed respectively to the axis of said stem $k$ and bearing against the end of a conical flap-valve $p$ which is seated in a taper opening provided in tube $j$. Said flap-valve $p$ is forced towards its seat by means of a spring $q$ which engages a notch in the head of said flap-valve.

When the outer cover $l$ is turned, a finger $o$ of stem $k$ forces the flap-valve outwardly away from its seat. The oil may thereafter flow in smaller or larger quantity into the nozzle $g$ of the grease-cup and fall therefrom into the tube $e$ from which it passes to the lubricating member. The position of the finger relatively to the valve, i. e. to the opening of the latter may be indicated by means of figures engraved on the upper surface of the lid $i$ which appear through an opening provided in the outer cover $l$. Said opening is also used for filling the grease-cup, as it may be brought into alignment with an aperture of like dimension provided in the lid $i$.

I claim:

1. A grease cup comprising a body portion provided with a lubricant outlet, a tube located within the body and communicating with said outlet, a valve arranged in the lower part of said tube and having its axis arranged at right angles to the axis of said tube, and means including an element arranged on the exterior of said body for actuating said valve.

2. A grease cup comprising a tubular body portion provided with a lubricant outlet, a tube extending through said body portion and communicating with said outlet, a valve arranged in the lower portion of said tube and having its head exposed to lubricant contained within the body portion, the axis of said valve being arranged perpendicularly to the axis of said tube, and means controlled from the exterior of the body portion and extending within said tube for controlling said valve.

3. A grease cup comprising a tubular body provided with a lubricant outlet, a tube arranged within the body portion and provided near its lower end with an aperture, a flap-valve controlling said aperture and having its axis intersecting the axis of the tube, a stem arranged within the tube and provided with an eccentrically arranged finger designed to engage said valve for controlling the opening of the same, and means located on the exterior of the body for controlling movements of said stem.

4. A device of the kind defined by claim 3 in which means are provided for closing said valve, said means comprising a spring engaging the tube and the valve.

5. A grease cup including a tubular body provided with a lubricant outlet, a tube located in the body, a valve arranged in the tube, a valve operating stem located in the tube and engaging said valve, a lid for said body provided with indicating marks, a spring carried by said lid and projecting through one side of the same, a cover fixed to said stem and overlying said lid, said cover being provided with spaced notches detachably engaged by said spring and an aperture in the cover for observing said indicating marks.

6. A lubricating device of the kind defined by claim 5 in which the lid is provided with an aperture adapted to cooperate with the aperture of said cover for filling the body.

In testimony whereof, I have signed my name to this specification in the presence of two subscribing witnesses.

EMILE PIQUEREZ.

Witnesses:
EDGAR FAVRE,
EMILE KUNG.